V. L. EMERSON.
SAFETY DAMPER FOR OIL STILLS AND THE LIKE.
APPLICATION FILED MAY 11, 1920.
1,352,255.
Patented Sept. 7, 1920.
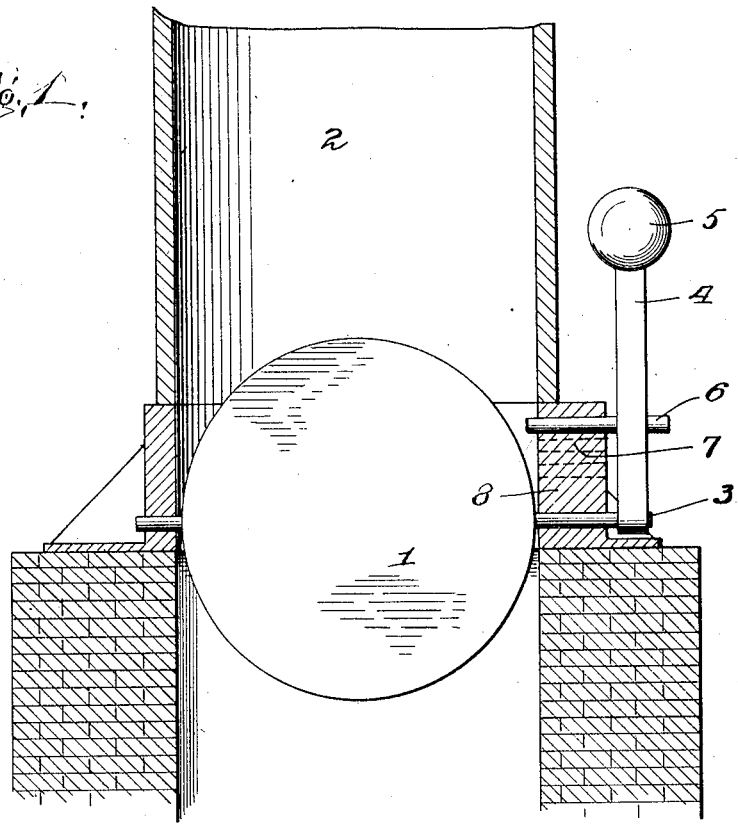
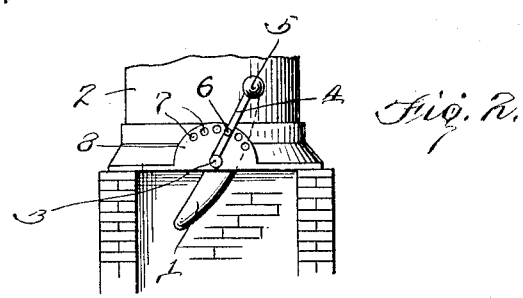
Inventor
Victor Lee Emerson.
By Lawrence S. Paddock
Attorney

UNITED STATES PATENT OFFICE.

VICTOR LEE EMERSON, OF PHILADELPHIA, PENNSYLVANIA.

SAFETY-DAMPER FOR OIL-STILLS AND THE LIKE.

1,352,255.  Specification of Letters Patent.  Patented Sept. 7, 1920.

Original application filed May 6, 1920, Serial No. 379,356. Divided and this application filed May 11, 1920. Serial No. 380,614.

*To all whom it may concern:*

Be it known that I, VICTOR LEE EMERSON, a citizen of the United States, residing at Philadelphia, in the county of Philadelphia and State of Pennsylvania, have invented certain new and useful Improvements in Safety-Dampers for Oil-Stills and the like, of which the following is a specification.

This invention relates to certain improvements in heat controlled dampers in connection with the flues of furnaces and particularly in connection with an oil still, such as disclosed in my co-pending application Serial No. 379,356, filed May 6, 1920, of which this application is a division.

An object of the invention is to provide a means whereby the damper will automatically close when the temperature in the flue in which the damper is placed reaches a dangerous point.

A further object is to provide means for limiting the opening and closing movement of the damper. A further object is to provide a means whereby the heat destructible element holding the damper in place may be removed or replaced without disturbing any of the other parts of the mechanism. A further object is to provide a simple device of this character with few and rugged parts which will not be destroyed by excess temperature.

Figure 1 is a vertical section of a stack showing my improved damper.

Fig. 2 is a detail view showing in particular the adjustable damper controlling means.

In the particular embodiment herein disclosed a damper indicated by the reference numeral 1 is inserted in the base of the stack 2. This damper is of such construction as will close off the passage to the stack when subjected to excess temperature. To this end the damper is provided with a pivot indicated at 3, which extends outwardly from the stack and is provided at its outer end with an arm 4. At the outer extremity of the arm 4 is placed a weight 5 sufficient to unbalance the damper and cause it to close by the action of gravity when the arm is released. A plug of heat destructible material is inserted through the arm 4 at the point 6 into a selected hole 7 in the plate 8. A series of holes are placed in the plate 8 to permit the damper to be adjusted to the angle desired.

I find that a plug of wood satisfactorily answers the purpose, but it is to be understood that the plug may be made of any temperature-responsive material, so that the plug will be destroyed when subjected to an excess temperature thus allowing the valve of the damper to be closed by the action of gravity.

By the construction herein shown I have provided a damper which will automatically close when the temperature in the flue reaches a dangerous point thus avoiding over-heating of the still with its consequent dangers.

What I claim is:

1. In combination with a stack, a damper therein, an operating rod for said damper and a heat destructible element situated in the path of movement of said operating rod and adapted to normally hold said damper in position.

2. In combination with a stack, a damper, a stationary element therein, an operating rod for said damper, a heat-destructible element located between said rod and stationary element for holding said operating rod in position and a weight attached to said operating rod in such a manner that said damper will assume a closed position when said heat-destructible element is destroyed by excessive heat.

3. In combination with a stack, a self-closing damper therein, an operating rod for said damper, a plate disposed in proximity to said operating rod and provided with a series of holes, a plug composed of heat-destructible material located between said operating rod and plate and inserted in one of said series of holes, and a weight attached to said operating rod in such a manner that said damper will assume a closed position when said plug is destroyed by excessive heat.

4. In combination with a stack, a self operating damper located therein, a movable element fastened to said damper, and adapted to move therewith, a stationary element, a heat destructible element located between said stationary and movable elements and normally retaining said movable element, said stationary element in a predetermined position being provided with means whereby said destructible element may retain said movable element in a plurality of predetermined positions.

5. A self-operating damper comprising a plate, a pivot rod therefor, a weighted operating rod attached to said pivot rod, a stationary member mounted adjacent said operating rod, a retaining member located between said stationary member and operating rod, said stationary member having means for receiving said retaining member in a plurality of positions.

In testimony whereof I have hereunto set my hand.

VICTOR LEE EMERSON.